United States Patent [19]

Rannali

[11] 4,424,645
[45] Jan. 10, 1984

[54] GROWTH SUBSTRATE BED

[75] Inventor: Pertti K. Rannali, Turku, Finland

[73] Assignee: Farmos-Yhtyma Oy, Turku, Finland

[21] Appl. No.: 297,124

[22] Filed: Aug. 28, 1981

[30] Foreign Application Priority Data

Oct. 23, 1980 [FI] Finland ............................. 803329

[51] Int. Cl.³ ............................................. A01G 9/10
[52] U.S. Cl. ........................................ 47/66; 47/56; 47/84
[58] Field of Search ................. 47/56, 84, 66; 119/1; 229/52 B

[56] References Cited

U.S. PATENT DOCUMENTS

| 2,876,588 | 3/1959 | Tietz et al. | 47/56 X |
| 3,362,106 | 1/1968 | Goldring | 47/56 |
| 3,733,745 | 5/1973 | Ingerstedt et al. | 47/77 |
| 3,961,444 | 6/1976 | Skaife | 47/84 X |
| 3,962,823 | 6/1976 | Zipperer | 47/73 |
| 3,971,160 | 7/1976 | Vajtay | 47/84 |
| 4,209,945 | 7/1980 | Dent et al. | 47/84 |

FOREIGN PATENT DOCUMENTS 1409791 10/1975 United Kingdom ................... 47/84

Primary Examiner—Robert E. Bagwill
Attorney, Agent, or Firm—McAulay, Fields, Fisher, Goldstein & Nissen

[57] ABSTRACT

This invention relates to a growth substrate bed suitable for growing plants, which is easy to handle and transport. Such a bed consists of a bag-shaped casing made of some suitable material, preferably plastic, and its contents consisting of water-expansible preferably granular, growth substrate material. Suitable growth substrate material are pressed peat pellets. The bag is partly filled with said materials to such an extent that after the watering the material will fill the bag completely. In order to preserve a uniform distribution of the material in the partly filled bag during handling and transportation before watering, the bed is rolled up, preferably in its longitudinal direction.

11 Claims, No Drawings

GROWTH SUBSTRATE BED

FIELD OF INVENTION

This invention relates to a growth substrate bed for plants, which is particularly intended for growing plants where the soil otherwise would be unsuitable for this purpose. Such growth substrate beds are known in different forms. Usually they consist of bags which are made of plastic or some similar material essentially impervious to moisture, and filled with some suitable growth material, preferably peat. Such a bag or bed is put on the desired growth place and into the upper surface of the bag will be cut suitable holes or greater openings depending on the sort of plant to be grown.

Different kinds of growth material can be used. However, for this purpose, peat to which fertilizers and lime have been added has proved to be especially useful for many kinds of plants. Synthetic growth substrates such as glass-wool or rock-wool have also been used for the same purpose. Naturally fertilizers and nutrients must be added to these substrates before planting or sowing.

In order to reduce the costs of transportation and handling, such growth substrate beds have been made essentially dry, i.e. the growth substance in the bag is essentially dry. To this dry and pulverized growth substance fertilizers and nutrients have been added, preferably in the manufacturing stage of the bed. It is practical to add the fertilizers and nutrients in dry form and mix them carefully with the pulverized growth substance. Alternatively, part of the fertilizers and nutrients can be added to the growth substrate bed on the growth place.

Further, it has been tried to reduce the necessary transportation volume of these growth substrate beds by using compressed growth substance such as pressed peat bloks. Then the growth substrate bag is not put completely full with pressed, dry material, but space is left for the swelling caused by the watering. Such growth substrate beds have proved to be very useful and easily handled because of the little space needed. However, a disadvantage of such a pressed block-shaped peat growth substrate is that when this block-shaped peat swells after the watering, necessary airiness is not obtained, although the peat body swells essentially from its pressed volume.

The airiness of the growth substance is of utmost importance in growth beds like these, because the bag material itself is impervious to air.

SUMMARY OF THE INVENTION

According to this invention, the necessary porosity and airiness have been obtained by using pressed peat pellets as bag filling material. Prior art structures of this type had the disadvantage that the short contents of the bag tend to move to one corner of the bag during the handling and transportation. If the bed is watered in this condition, the result is an unevenly filled bag, the contents of which cannot possibly be uniformly distributed once the wetted substance has swollen. Also before watering, the distribution of the contents has proven difficult and time-consuming.

According to the invention, this problem has been solved so that in the manufacturing of the growth substrate bed, the partially filled bag with contents uniformly distributed on the lower surface is rolled up. It has been found that the contents inside the uprolled bag remain essentially stationary. Not even hard handling will cause any notable movement of the substance inside the bag. Before the bed is rolled up, possible surplus air therein is preferably removed. This roll is unrolled only on the final growth place. When unrolled, holes necessary for the plants to be set or sown are cut into the upper surface of the bag. Then the bag is wetted with a suitably amount of water, after which the substance swells and fills the bag uniformly.

DISCLOSURE OF BEST MODE

The size of the growth substrate bed can vary within a wide range depending on the purpose of use. For amateur gardening, where herbs are grown, for example, on window ledges, balconies or near holiday cottages in rocky soil, a suitable size of the bed corresponds to the dimensions of the window ledge: length 1.5 m and breadth 25 cm. A suitable height of wetted substrate bed is 10–15 cm.

For such a growth substrate bed, it is preferred to use peat pellets made by pressing suitable coarse fertilized peat. The specific weight of such peat pellets may be approximately 600 g/l. One kilo of these pellets gives about 7–8 l wetted growth substrate peat. The growth bed is preferably filled to about 1/5–⅓ of its volume with said peat pellets, so that wetting provides a completely filled growth bed, but wherein the growth substrate nevertheless is porous enough to ensure to the roots of the plants necessary airiness. The airiness of the growth substrate material is especially important in such growth beds, wherein the bag is made of hermetic plastic, because the air necessary for the root system of the plants must then pass through the bed from the holes cut into the upper surface of the bag.

The growth substrate bed described above has proved to be very useful for a variety of smaller plants on different kinds of growth places, for example on bare rock. The tight surface material of the bed is then advantageous, because the water added to the bed is very well kept by the bed, and the plants thrive also for longer times without watering. This is important especially for amateur gardeners growing plants near holiday cottages, where the plants usually are watered in the weekends only.

Pressed peat pellets have above been recommended for use as the growth substrate material, and obviously this is the most suitable material for this purpose. It is, of course, fully within the scope of this invention to use other well known, preferably granular, growth substrate materials, too. It is, however, necessary that such materials have a good swelling ability when watered and a good airiness also in wetted condition.

I claim:

1. A growth substrate bed consisting of:
   a flexible, rollable, container capable of assuming a first rolled configuration and a second unrolled configuration; and
   a dry particulate growth medium in pellet form capable of swelling when water is added thereto, said growth medium when in its dry, unswelled state being evenly distributed in and partially filling said container when said container is in its rolled configuration, said growth medium when in its wetted, swelled state substantially filling said container when said container is in its unrolled configuration, said container when in said rolled configuration being held sufficiently tight to prevent a substantial displacement of said dry growth medium during handling and transportation of said container such that when said container is unrolled to assume its unrolled configuration and said dry growth medium is wetted, said growth medium needs no repositioning.

2. The package of claim 1, wherein said container is filled to about 1/5 to ⅓ of its volume.

3. The package of claim 2, wherein said container is made of plastic.

4. The package of claim 2, wherein the specific weight of the peat pellets is about 600 g/l.

5. The package of claim 3, wherein the specific weight of the peat pellets is about 600 g/l.

6. The package of claim 1, wherein said container is made of plastic.

7. The package of claim 6, wherein the specific weight of the peat pellets is about 600 g/l.

8. The package of claim 1, wherein the specific weight of the peat pellet is about 600 g/l.

9. The package of claim 1, wherein the upper surface of said container has openings for plants or seeds.

10. In a growth substrate bed having a flexible container fastened in a rolled configuration and partly filled with a dry growth medium which swells when water is added thereto so as to substantially fill the container, the improvement comprising:

said flexible container being rollable and capable of assuming a first rolled configuration and a second unrolled configuration; and the dry growth medium being a dry particulate growth medium in pellet form capable of swelling when the water is added thereto;

said growth medium when in its dry, unswelled state being evenly distributed in and partially filling said container when said container is in its rolled configuration, and said growth medium when in its wetted, swelled state substantially filling said container when said container is in its unrolled configuration and;

said container when in its rolled configuration being held sufficiently tight to prevent a substantial displacement of said dry growth medium during handling and transportation of said container such that when said container is unrolled to assume its unrolled configuration and said dry growth medium is wetted, said growth medium needs no repositioning.

11. In a growth substrate as claimed in claim 10, wherein said container is filled to 1/5 to ⅓ of its volume.

* * * * *